United States Patent [19]

Hemus

[11] Patent Number: 5,024,317

[45] Date of Patent: Jun. 18, 1991

[54] METHOD AND APPARATUS FOR CLOSING CARTONS

[75] Inventor: David S. Hemus, Cirencester, England

[73] Assignee: CMB Foodcan plc, Worcester, England

[21] Appl. No.: 437,631

[22] Filed: Nov. 16, 1989

[30] Foreign Application Priority Data

Nov. 18, 1988 [GB] United Kingdom ............... 8826962

[51] Int. Cl.⁵ ..................... B65G 19/00; B65G 47/24; B65B 7/20
[52] U.S. Cl. .................................... 198/415; 198/718; 53/484; 53/374
[58] Field of Search ............... 53/333, 377, 477, 484, 53/487, 488, 491, 387, 374; 198/415, 718, 732

[56] References Cited

U.S. PATENT DOCUMENTS

| | | | |
|---|---|---|---|
| 1,321,303 | 11/1919 | Haldeman | 198/415 |
| 1,616,101 | 2/1927 | Ackley | 198/415 X |
| 2,769,528 | 11/1956 | Goodrich et al. | 198/718 |
| 2,984,332 | 5/1961 | Pierce, Jr. | |
| 3,047,123 | 7/1962 | McKay | 198/415 |
| 3,225,896 | 12/1965 | Krueger et al. | 198/732 |
| 3,306,424 | 2/1967 | Fahrenbach | 198/415 X |
| 3,432,023 | 3/1969 | Lucas | |
| 4,085,839 | 4/1978 | Crawford | 198/416 X |
| 4,417,653 | 11/1983 | Zwezerynen | 198/718 |
| 4,672,792 | 6/1987 | Wallin | 53/377 X |
| 4,901,842 | 2/1990 | Lemboke et al. | 198/415 |

FOREIGN PATENT DOCUMENTS

0074129 3/1983 European Pat. Off.
914237 12/1962 United Kingdom.

Primary Examiner—Robert L. Spruill
Assistant Examiner—Beth Bianca
Attorney, Agent, or Firm—Burns, Doane, Swecker & Mathis

[57] ABSTRACT

An apparatus for closing lidded cartons has a turning station including a flightless horizontal conveyor, and a chain conveyor which extends along one side of the flightless conveyor and has light restraint members pivotally mounted on its links. The chain conveyor is moved in the same direction as the horizontal conveyor, but at a slower speed. Part way along the chain conveyor an upwardly directed air jet moves the restraint members individually but in succession to temporary raised positions in which they are available for engagement by a carton which is moving along the flightless conveyor in overlapping relation to the chain conveyor. A restraint member engaged by a carton in this way thereafter serves as a fulcrum about which the carton pivots through a substantial angle. Plough bars later complete the rotation of the carton through 90° in total.

27 Claims, 7 Drawing Sheets

METHOD AND APPARATUS FOR CLOSING CARTONS

This invention relates to methods and apparatus for closing packaging cartons, for example, of a food product such as pancakes.

One form of carton which is widely used for food packaging has the form of a rectangular tray with a lid hinged along one side edge to the top of one of the four side panels forming the side wall of the tray. The lid has glue flaps hinged along its three other side edges, and after the tray has been filled with the food product it is required to close and seal the lid by glueing these glue flaps against the respective side panels of the tray.

In high speed food packaging lines this is usually achieved by (a) closing the lid with the glue flaps still in their original coplanar relation with the lid, (b) bending down and sealing that glue flap which is opposite the hinge line of the tray, and (c) bending down and sealing the two remaining, opposed glue flaps simultaneously. Operations (a), (b) and (c) are performed in sequence whilst the carton is moving along a conveyor, the lid bending and sealing operations being performed by suitable devices which are situated alongside the conveyor path so as to be effective on the carton as it passes.

The glue flaps involved in operations (b) and (c) are disposed at 90° to each other, and either the conveyor or the carton itself is turned through 90° to allow the sealing devices to be effective. A 90° bend in the carton path, however, is wasteful of space, and reorientation of the carton is usually preferred. For that reason the present invention seeks to provide a method and apparatus capable of achieving rotation of the carton through a substantial angle, in a reliable and controlled manner and potentially at a high speed.

In accordance with the invention from one aspect there is therefore provided a method of closing a carton in which the carton is moved along a predetermined path and turned through 90° as it moves along the path, the method comprising advancing the carton along the path at a first speed whilst supported from beneath but rotatable in a generally horizontal plane, and engaging the front of the carton adjacent one side thereof with a raised member moving along the path in the same direction as the carton but at a second speed lower than the first speed, the raised member thereby forming a fulcrum around which the carton is caused to rotate through a substantial angle as it moves along the path.

The invention also provides, in accordance with a second aspect thereof, an apparatus for closing a carton, which comprises a flightless conveyor means arranged for supporting and driving the carton for movement at a first speed along a predetermined path within which the carton is generally free to rotate, and an elongate movable restraint means mounted to extend along one side of the conveyor means over at least part of the length of the same whereby a carton carried along the path by the conveyor means may move in partially overlapped relation to the restraint means, the restraint means being driven to move in the same direction as the conveyor means but at a second speed which is slower than the said first speed, and including a plurality of spaced restraint members which are individually movable from retracted positions to raised positions in which they are engageable by a said carton moving along the path, such engagement occurring at the front of the carton adjacent one side thereof and causing the engaged restraint member subsequently to act as a fulcrum around which the carton is caused to rotate through a substantial angle, the apparatus further including a member raising means disposed at a predetermined location of the path and arranged for yieldably raising the restraint members to their raised positions in succession.

In order that the invention may be more fully understood an embodiment thereof and a variation of the embodiment will now be described, by way of example, and with reference to the accompanying diagrammatic drawings, in which.

Figure 1:
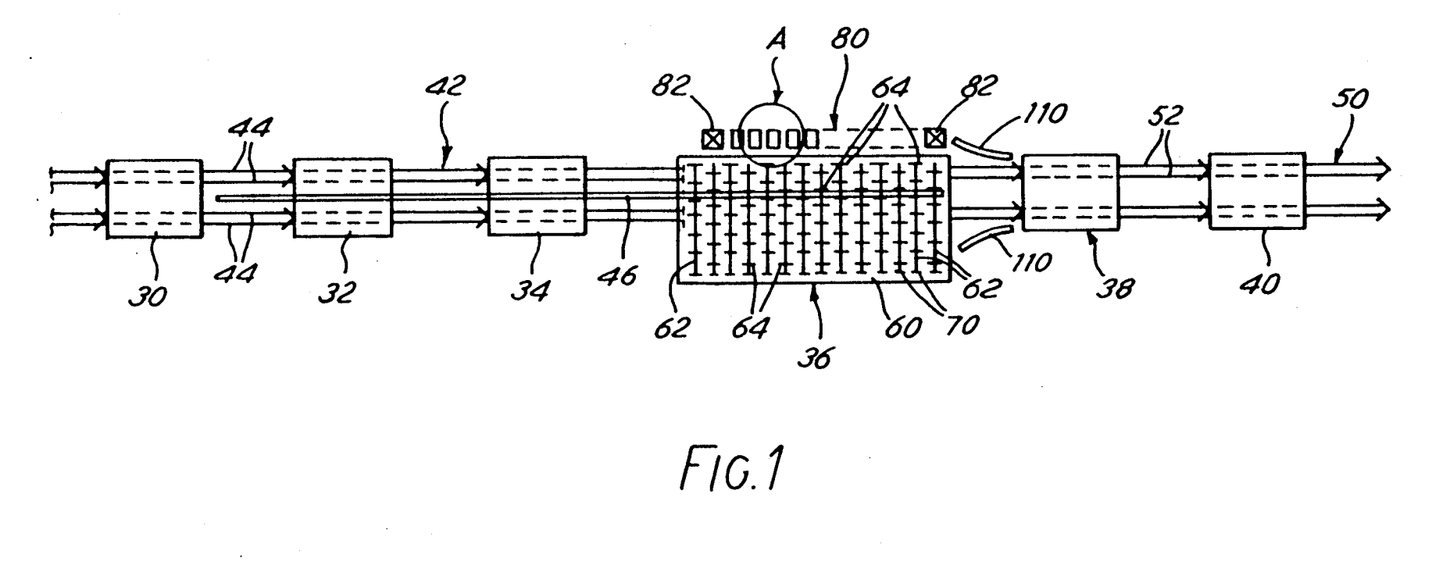
FIG. 1 is a schematic diagram showing the various stations of a carton closing machine in accordance with the invention.
Figure 2:
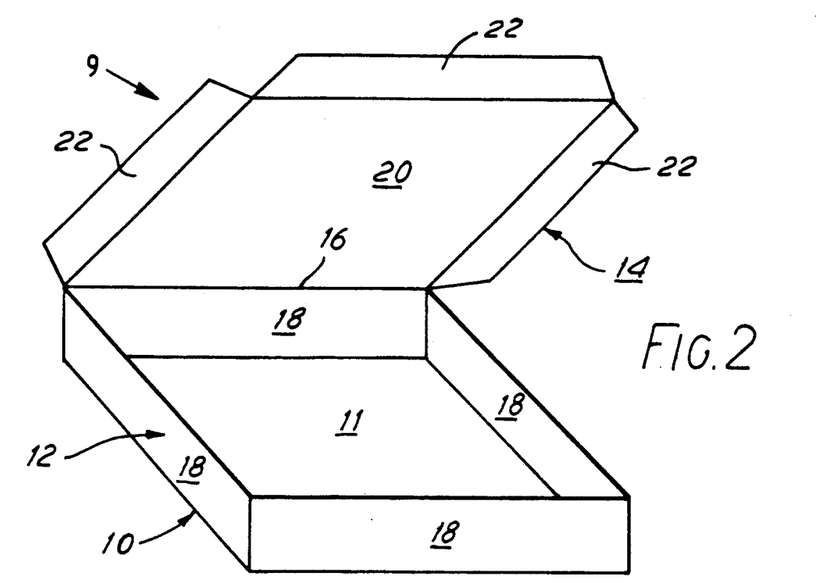
FIG. 2 shows a carton which the machine is adapted to close after filling with a food product.

Referring firstly to FIGS. 1 and 2, a carton closing machine as depicted in FIG. 1 is adapted to close a succession of cartons as shown in FIG. 2 after they have been filled with a food product such as crispy pancakes. Each carton (FIG. 2) is made of a suitable cartonboard material and is generally rectangular. It has a product-receiving tray 10 with a rectangular base 11 and side wall 12, and a lid 14 which is hinged on a hinge line 16 to the top of one of the four side panels 18 forming the side wall. The lid has a closure panel 20 for closing the open mouth of the tray after product filling, and glue flaps 22 attached to the three free side edges of the closure panel and arranged to be turned down and bonded against the respective side panels 18 to seal the carton closed in known manner.

To close and seal the carton 9 after product filling the machine shown schematically in FIG. 1 has, in sequence, a lid-closing station 30, a lid aligning station 32, a first closing and sealing station 34 at which the glue flap 22 opposite the hinge line 16 of the carton is turned down and sealed against the respective side panel 18, a turning station 36, a coding station 38, and a second closing and sealing station 40 at which the two remaining, opposed glue flaps are turned down and sealed against their respective side panels 18. The cartons move one at a time through the machine passing from left to right as shown in FIG. 1. For clarity no cartons are shown in FIG. 1.

Each carton is carried through the stations 30, 32 and 34 when orientated so that the hinge line 16 (FIG. 2)

extends along the direction of movement, by an input conveyor 42 on which the carton is supported. The conveyor 42 is formed by four endless belts 44 arranged to circulate in vertical planes and the upper runs of which provide support and motive power for the cartons and propel them through the stations 30, 32 and 34 by frictional engagement with their undersurfaces; the belts are formed of an elastomeric material and, as shown, are arranged as two laterally spaced pairs.

Whilst passing through the stations 32, 34 and 36 that is, following the closing of the lid at the station 30, the carton is held closed by a bar 46 which extends above and along the belt conveyor in a position to provide a passive restraint for the lid. In the station 32 the lid, which at this time is horizontal and has its glue flaps 22 coplanar with its closure panel 20, is adjusted rotationally in the horizontal plane to position it properly in relation to the tray 10 beneath. This is achieved by engaging the free glue flap along the side of the carton path from above and below by a pair of opposed rotating friction wheels, so that it is forced frictionally against an adjustable stop in correct alignment with the tray. For clarity the friction wheels and the stop are not shown in the drawings.

The turning down and sealing of the first glue flap at the station 34 is achieved by any suitable means and is therefore not described. A similar means is used, on either side of the carton path, for turning down and sealing the remaining glue flaps at the station 40, and in this respect it is to be understood that the carton is carried through the stations 38, 40 by an output conveyor 50 similar to the input conveyor 42 and likewise formed of four laterally spaced endless belts 52. Applicants propose that sealing of the glue flaps should be achieved by use of a heat-softenable polymeric coating on the inside surface of the tray as a heat-sealing medium; ploughs or resiliently mounted rollers are provided as required for turning down the glue flaps to positions at which hot air can be directed onto them, and thereafter closing the glue flaps against the respective side panels 18 and holding them in position until the polymeric coating has cooled and hardened.

At the time when it passes through the coding station 38 the carton 9 has its lid held closed by the glue flap which has already been sealed down. The remaining two glue flaps, however, are still coplanar with the closure panel 20, and in the coding station one of these free glue flaps is printed with a suitable coding mark enabling the carton later to be identified.

Figure 3:
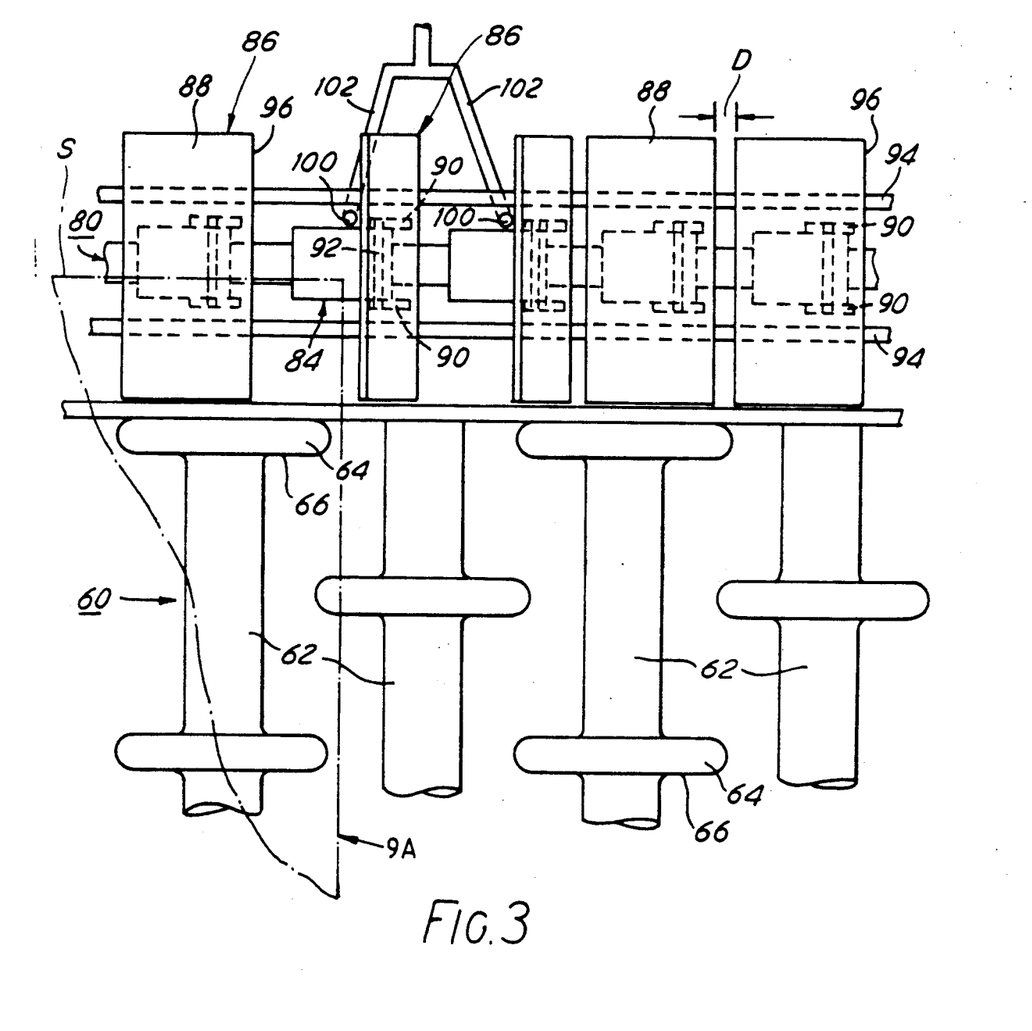
FIG. 3 is a plan view of a part of the turning station of the machine at which successive cartons are turned through 90° of angle.

FIG. 3 in conjunction with FIG. 1, shows the arrangement of the turning station 36. The station has a rectangular bed 60 of transversely extending rollers 62 which are mounted for rotation about parallel, horizontal axes so that their upper peripheries may provide the support surface for the cartons passing along the turning station. The roller peripheries are provided by bands 64 advantageously formed of the same elastomeric material as that of the belts 44, 52, and each mounted as a tread of a disc-like enlargement or knuckle 66 of their respective roller. As indicated in FIG. 1, each roller has several enlargements and bands 64 equally spaced along its length, successive rollers of the bed 60 having their enlargements 66 and associated bands axially offset by one half of their spacing to allow the rollers to be interdigitated to provide for the cartons an effectively continuous support surface along which the cartons are driven by frictional engagement with their undersurfaces. It will therefore be understood that the bed 60 is flightless, that is to say, it has nothing which defines or determines the position of a carton moving along it.

The cartons arrive on the input conveyor 42 from the first closing and sealing station 34 with the two unsealed glue flaps located at the leading and trailing edges of the carton and still coplanar with the lid closure panel 20. They move along the bed 60 adjacent one of its sides, the upper one as shown in FIG. 1. Along that side of the bed extends the upper run of an endless chain 80 which is arranged to circulate in a vertical plane about sprockets 82 at each end. The upstream one of the two sprockets is located a small distance downstream of the upstream end of the bed; moreover, the length and lateral position of the bed 60 and chain in relation to the input conveyor and its associated guides (not shown) are such that cartons move along a major part of the length of the bed with a small but significant part of their lateral width overhanging the chain. As will become apparent, the bed 60 and chain in combination effect the turning of each carton through a substantial angle approaching 90°; their lengths and the width of the bed are chosen accordingly.

The arrangement of the chain 80 is shown diagrammatically in FIG. 3 which shows the part of its length encircled in FIG. 1 and indicated by the reference A. The links 84 of the chain serve to support restraint members 86 of a light plastics material which are regularly spaced along the length of the chain. Each restraint member has an elongate, generally plane plate portion 88 which extends transversely of the bed 60, the restraint members of the upper run of the chain usually forming a substantially continuous and flat, upwardly facing horizontal surface over which the projecting edges of the cartons may move without engagement with the restraint members. The restraint members are each attached to the respective link by a pair of lugs 90 which are formed integrally with, and dependant from, the plate portions so as to straddle the link. Pins 92 extend through the links and the lugs on either side to mount the restraint members for loose but limited pivotal movement in the fore and aft direction in relation to the chain.

The plate portions are offset in relation to the lugs in the upstream direction of the chain 80, so as normally to bias the restraint members by gravity to the generally horizontal positions described in the previous paragraph; they are supported in that position by engagement of the undersurfaces of their plate portions with elongate guides 94 between which the upper run of the chain extends.

The same guides provide a limit to the forward pivotal movement available for the restraint members, by engagement with the front edges 96 of the plate portions. This engagement occurs when the plate portions are substantially vertical, so as to present their general plane undersurfaces to the cartons moving along the bed 60.

The chain is circulated so that its upper run moves in the downstream direction of the bed 60 alongside it, at a speed which is slower than, typically between 50% and 95% of, the forward speed of the bed 60 and therefore of the cartons passing along it. The chain 80, the rollers 62 of the bed 60, and the input and output conveyors 42, 50 are driven independently of one another under microprocessor control. For clarity their drive arrangements are omitted entirely from the drawings, with the exception of the rollers 62 which have drive sprockets 70 (FIG. 1) at their ends remote from the chain, with which an underlying drive chain (not shown) is arranged to engage.

The speed of the chain 80 is insufficient to throw the restraint members 86 forward and into their raised positions as they move around the upstream sprocket 82 onto the upper run of the chain; the restraint members moving onto the upper run are therefore horizontal. The side S of the carton 9A extending in the direction of the path of travel of the carton has a length less than the distance D by which adjacent restraint members 86 are spaced, as is depicted in FIG. 3. Shortly after the restraint members move onto the upper run the restraint members pass an upwardly directed jet of pressurised air produced by an air nozzle 100 from a pipe 102 supplied from a suitable source. Two such jets are provided in FIG. 3 for security of operation; they are directed against the undersurfaces of successive restraint members, and are of sufficient intensity to momentarily raise those restraint members to their lifted positions. Thus, cartons which have moved onto the bed 60 from the input conveyor 42 are presented with at least one, and probably two, raised restraint members as they move along the chain. As is illustrated in FIG. 3 for one carton 9A (shown in broken outline), its greater forward speed causes each carton in turn to engage a raised restraint member at its front end adjacent its nearside corner, after which that restraint member, whilst still maintained in its raised position by engagement with the carton, provides a fulcrum about which the carton is turned by virtue of the faster forward speed of the bed 60 as the carton moves along it.

In this way the cartons are successively turned through an angle approaching 90° as they move along the bed, the required reorientation through 90° being completed by shaped ploughs 110 at the upstream end of the output conveyor 50 (FIG. 1). At the end of their reorientation the cartons leave the restraint member which has served as their fulcrum, so allowing it to be returned by gravity to its normal horizontal position.

FIGS. 6 to 9 show details of a further and slightly modified arrangement of turning station 36 from that shown in FIGS. 1 and 3, the same reference numerals as before being used wherever appropriate to indicate like parts. The turning station again has a rectangular bed 60 (FIG. 8) of transversely extending and rotatably driven rollers 62, the upper peripheries of which provide an essentially uninterrupted and flightless support and drive surface for cartons 9 passing along the bed. Also as before, a chain conveyor 80, which is driven in the same direction as the bed but at a lower speed, is mounted alongside the bed so that cartons passing along the bed partially overhang it for engagement by light plastics restraint members 86 which are rotatably supported by the chain conveyor. For clarity, in FIG. 8 (and FIG. 9) the chain conveyor is not specifically shown, but its centreline is indicated by a chain-dotted line.

Figure 6A:
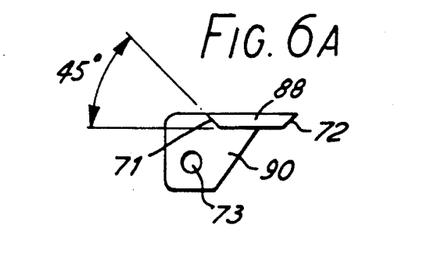
FIGS. 6A–6C show a restraint member of a further turning station in accordance with the invention and similar to that shown in FIG. 3.
Figure 6B:
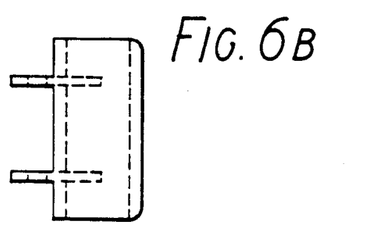
Figure 6C:
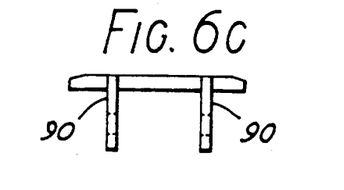

FIG. 6 shows one of the restraint members 86 in side elevation (FIG. 6A), upper plan view (FIG. 6B) and end elevation as seen looking upstream of the chain conveyor (FIG. 6C). The plate portion 88 of the restraint member has its leading and trailing edges 71, 72 chamfered at 45° as shown. The downwardly depending lugs 90 are formed with aligned holes 73 for pivotal engagement with the links of the chain conveyor (as is later described), and it will be seen that the plate portion is offset in the upstream direction in relation to the holes so that by its weight it can bias the restraint member into its horizontal attitude shown.

Figure 7A:
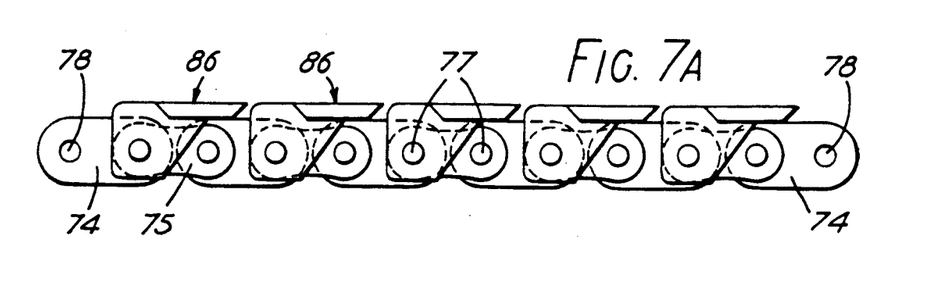
FIGS. 7A and 7B show, respectively in side elevation and plan view, a length of the chain conveyor of the further turning station, having the restraint members of FIG. 6 mounted thereon.
Figure 7B:
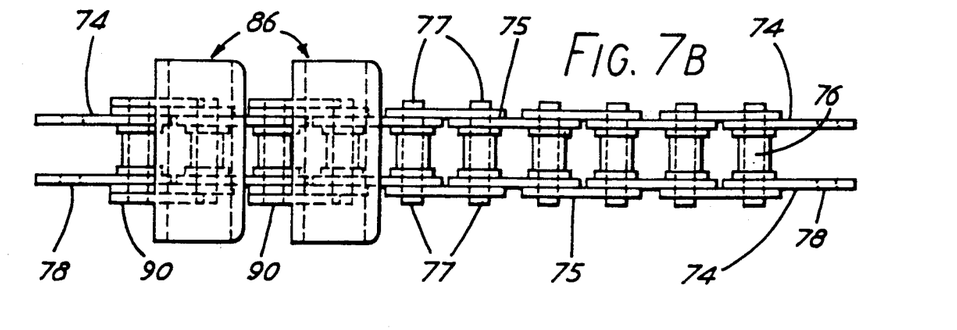

The arrangement of the chain conveyor 80 and the mounting of the restraint members 86 is evident from FIGS. 7A and 7B which variously show a length of the conveyor as seen in side elevation (FIG. 7A) and from above (FIG. 7B). The chain conveyor is conventionally formed of pairs of spaced inner links 74, pairs of spaced outer links 75 joining adjacent ends of the inner links, rollers 76 separating the inner links of each pair from one another, and pins 77 on which the rollers are sleeved and which pass through holes (e.g. 78) in the inner and outer links to articulate those links together.

For mounting the restraint members 86 the pins are elongated so as to project beyond the outer links 75. The restraint members are sprung resiliently over the projecting ends of the pins, the latter projecting through the holes 73 of the lugs 90 to mount the restraint members for rocking movement in the fore and aft direction of the chain conveyor. For clarity only two restraint members are shown in FIG. 7B, the remainder have been removed to reveal the links 74 and 75, rollers 76 and pins 77 beneath. In the horizontal, rest positions of the restraint members the under surfaces of the plate portions 88 engage the upper surface presented by the chain conveyor.

Figure 8:
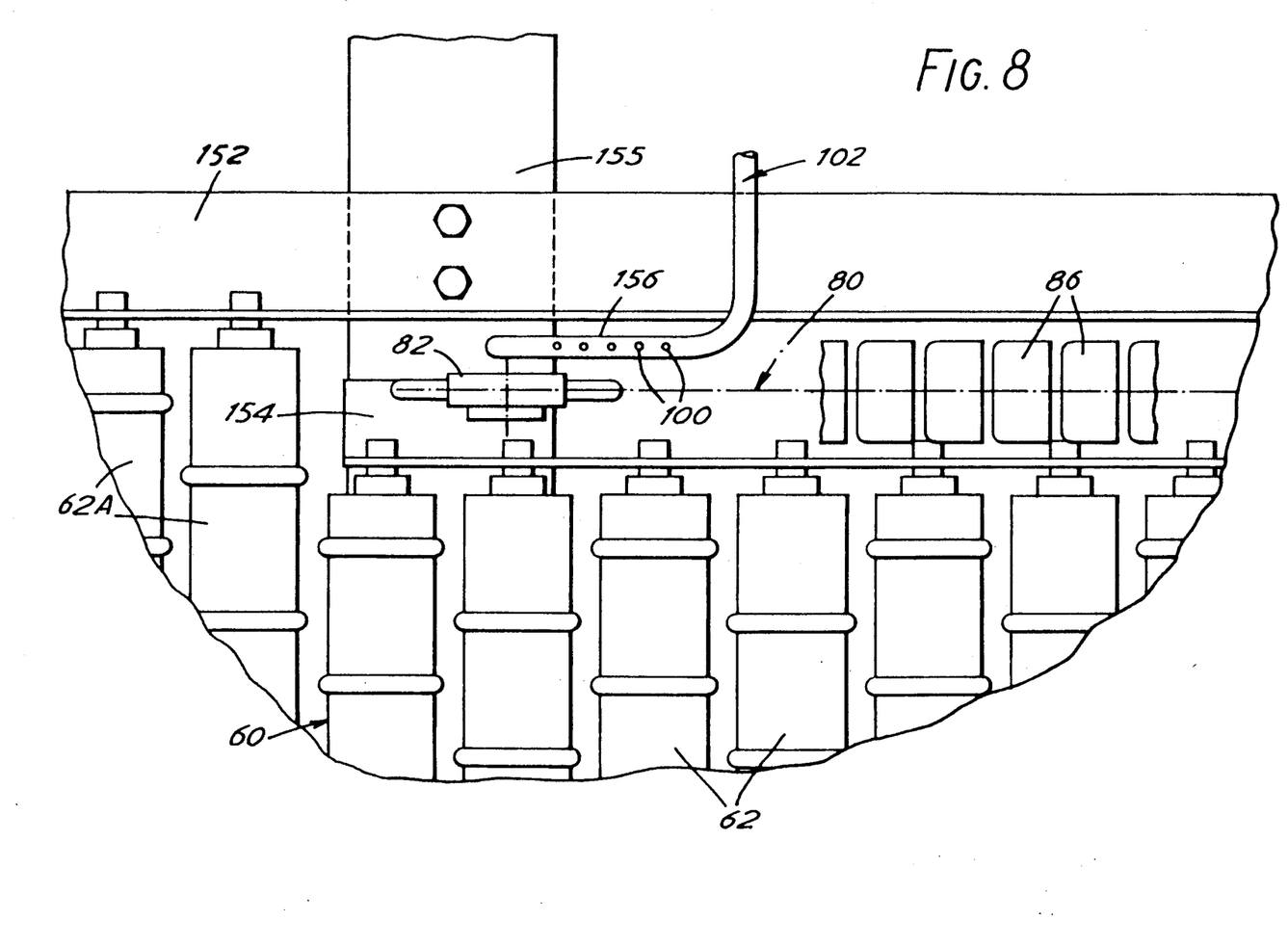
FIG. 8 shows part of the further turning station in plan view of the chain conveyor being represented by a chain-dotted line.

FIG. 8 is a plan view of part of the rectangular bed 60 and of the upstream end of the chain conveyor 80. The rollers 62 of the rectangular bed are journalled in horizontal angle members 152, 154 which are bolted to the machine at transverse support bars 155. The rollers are rotatably driven by a belt drive (not shown) at their ends opposite to those visible in FIG. 8, and it will be seen that those rollers—referenced 62A—which are disposed upstream of the chain conveyor are elongated so as to extend across the upstream end of the chain conveyor. Cartons which pass along the bed at the correct lateral position therefore move along and over the chain conveyor in the desired partially overlapping relationship.

Figure 9:
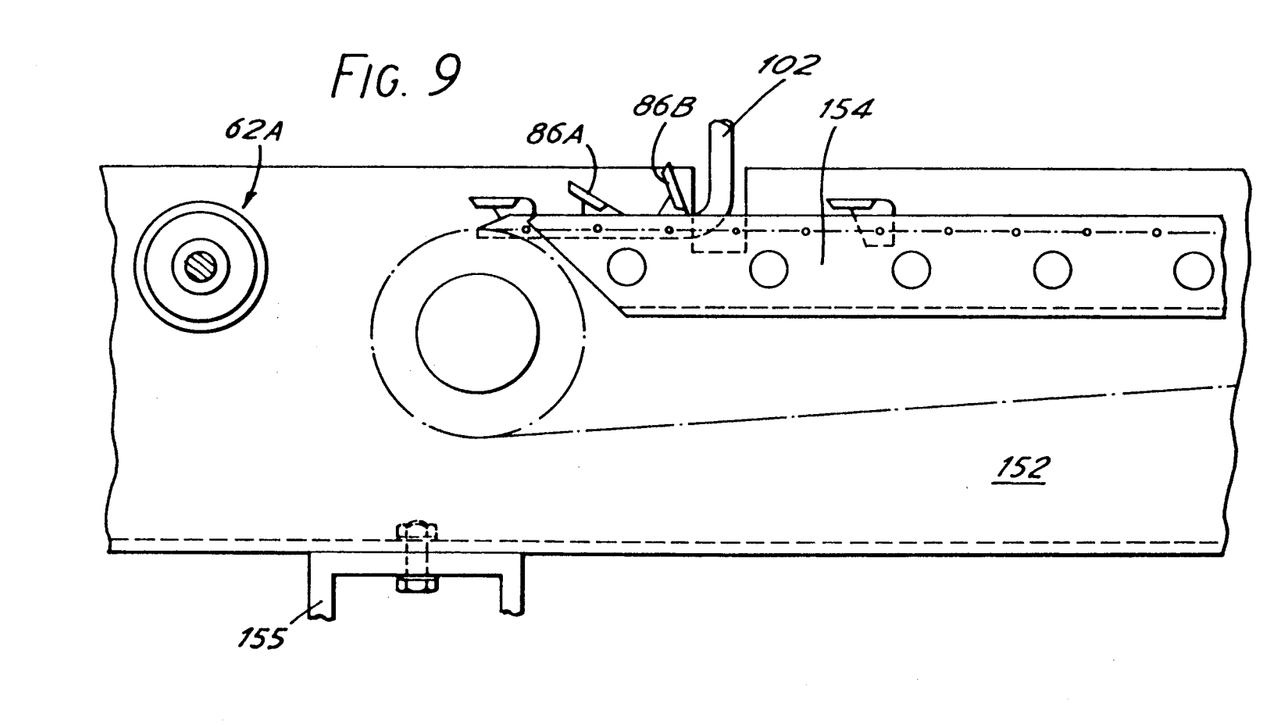
FIG. 9 is a corresponding simplified view of part of the further turning station as seen in side elevation.

Also visible in FIG. 8 is a pipe 102 to which pressurised air is fed to achieve the momentary elevation of the restraint members 86. A length 156 of the pipe adjacent its free end extends along and beneath the chain conveyor and has nozzles in the form of spaced holes 100 through which air can escape at high velocity in an upward direction. The holes span approximatley two of the restraint members as they move above the length of pipe 156, and FIG. 9 is a scrap view of the chain conveyor as seen in side elevation and showing one restraint member (86A) in a partially raised position as it first moves over the holes 100, the succeeding restraint member (86B) in the downstream direction being in the fully raised position which it adopts when engaged by a carton. (It is to be understood that, by virtue of its greater forward speed, a carton moving over the chain conveyor is able to engage and, if necessary, to lift a restraint member to its fully raised position, provided that the restraint member is initially at least in a partially raised position such as that of the restraint member 86A.)

As can be seen from the restraint member particularly referenced 86B, when in their fully raised positions (determined by engagement of their leading edges 71 with the upper surface of the chain conveyor 80) the restraint members 86 are inclined to the vertical by an angle of approximately 25° in the upstream direction; accordingly they present their chamfered trailing edges 72 for engagement by a carton. This backward inclination of the restraint members when fully raised assists them to return quickly by gravity to their horizontal positions after release by a carton or, as appropriate, after having passed the location at which air issues from the length of pipe 156. There is therefore little or no possibility that those restraint members which are passing along the upstream run of the chain conveyor but which are not in use as fulcrums for cartons (as previously described) will impede or snag any cartons which are undergoing turning.

Figure 4:
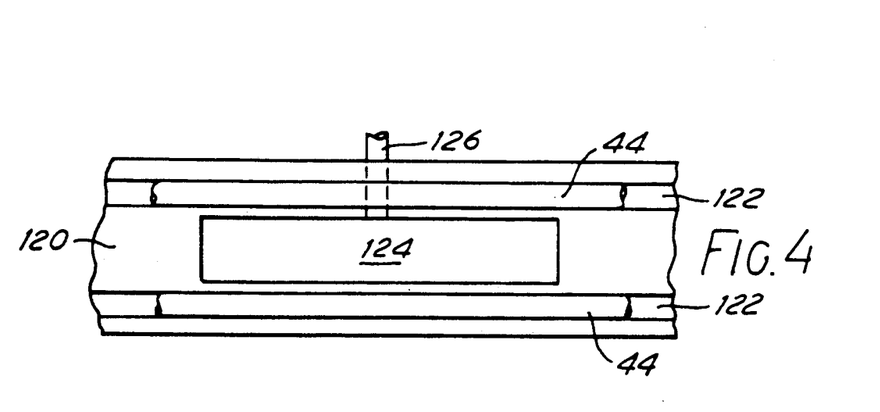
FIG. 4 shows a detail of the machine as seen from above.

A feature of the machine which is incorporated into the lid-closing station is a vacuum hold-down device associated with each of the pairs of belts 44 of the input conveyor 46. FIG. 4 shows one such device.

Referring now to FIG. 4, the two belts 44 are supported and guided for longitudinal movement by a bed 120 of a low friction plastics material. The bed has parallel, part-circular grooves 122 formed in its upper surface, within which the lower parts of the belts are received.

Between the belts 44 the bed has a cavity 124 to which a vacuum pipe 126 is connected. When a carton is passing along the bed carried and supported by the belts, the cavity is substantially closed off by the carton above, the belts along each side, and the bed at each end, and a substantial force can therefore be exerted on the carton by reduced pressure generated in the cavity. In the machine shown in FIG. 1 this reduced pressure enables the carton tray to be held firmly onto the belts and against inadvertent movement whilst the lid is being folded. Also, it enables a carton the belts 44 to act as a stop or restraint for cartons behind it.

Figure 5:
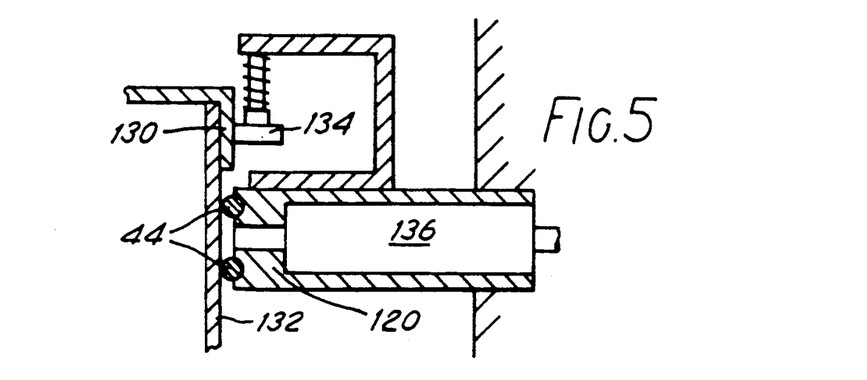
FIG. 5 is a cross-sectional view of a feature similar to that shown in FIG. 4 and when applied to carton closing.

FIG. 5 shows another use of a vacuum hold-down device such as is shown in FIG. 4. In that figure a flap 130 on a carton requires to be held firmly against a panel 132 of the carton whilst an adhesive or heat-seal bond is being formed between them. The flap is resiliently engaged by a roller 134, whilst the carton panel is restrained against inward movement by reduced pressure formed in a cavity 136 between two belts 44 in a bed 120 along which the belts are moved with the carton. Such an arrangement is of particular value for applications where the carton panel is largely unsupported and access to the carton interior is unavailable or severely restricted.

I claim:

1. A method of closing a carton in which the carton is moved along a predetermined path and turned through 90° as it moves along the path, the method comprising advancing the carton along the path at a first speed whilst supported from beneath but rotatable in a generally horizontal plane, raising the restraint member from an inoperative, retracted position to a raised position at a predetermined location of the carton path by impinging pressurized air on the member at said location, and engaging the front of the carton adjacent one side thereof with the raised member moving along the path in the same direction as the carton but a second speed lower than the first speed, the raised member thereby forming a fulcrum around which the carton is caused to rotate through a substantial angle as it moves along the path.

2. A method as claimed in claim 1 including the step of returning the member from its raised to its retracted position subsequent to passing the said location and after disengagement by the carton.

3. A method as claimed in claim 1, wherein the engagement with the restraint member is effective to turn the carton through an angle which is substantial but less than 90°, the method including the further step of engaging the carton by a fixed restraint to effect turning through 90° in total.

4. An apparatus for closing a carton, which comprises a flightless conveyor means arranged for supporting and driving the carton for movement at a first speed along a predetermined path within which the carton is generally free to rotate, and an elongate movable restraint means mounted to extend along one side of the conveyor means over at least part of the length of the same whereby a carton carried along the path by the conveyor means may move in partially overlapped relation to the restraint means, the restraint means being driven to move in the same direction as the conveyor means but at a second speed which is slower than the said first speed, and including a plurality of spaced restraint members which are individually movable from retracted positions to raised positions in which they are engageable by a said carton moving along the path, such engagement occurring at the front of the carton adjacent one side thereof and causing the engaged restraint member subsequently to act as a fulcrum around which the carton is caused to rotate through a substantial angle, the apparatus further including a member raising means disposed at a predetermined location of the path and arranged for yieldably raising the restraint members to their raised positions in succession, said member raising means comprising means for impinging pressurized air on the restraint members.

5. Apparatus according to claim 4, wherein the conveyor means comprises a plurality of spaced rollers having bands of elastromeric material at which to engage the undersurface of a carton moving along the path.

6. Apparatus according to claim 4, wherein the restraint means comprises an endless chain conveyor having transversely extending pins spaced along its length, the restraint members being pivotally mounted on the pins for rotation to and from their raised positions.

7. Apparatus according to claim 6, wherein the restraint members have substantially plane plate portions, and depending lug portions in pivotal engagement with the pins, in the restracted positions of the restraint members the plate portions being horizontal and generally coplanar.

8. Apparatus according to claim 7, wherein in the retracted positions of the restraint members the plate portions are spaced from and below the undersurface of a carton moving along the path.

9. Apparatus according to claim 6, wherein the restraint members are individually biassed to their retracted positions but raisable by the member raising means at the said location.

10. Apparatus according to claim 9, wherein the restraint members are biassed to their retracted positions by gravity.

11. Apparatus according to claim 4, which includes a plough means operative upon the carton subsequent to the restraint means so as with the restraint means to turn the carton through 90° in total.

12. In a method of closing cartons wherein the cartons are turned while being moved along a predetermined path, the method comprising the steps of advancing the cartons along the path in spaced apart relationship while supported from beneath but rotatable in a generally horizontal plane; moving a plurality of raisable restraint members along the path beneath the cartons at a location adjacent a side of each carton, said side extending generally in the direction of said path, the restraint members being normally disposed in lowered positions and spaced apart by a distance less than a length of said side of each carton, applying a yieldable raising force sequentially to the restraint members as they pass a raising station, whereby restraint members situated between adjacent cartons are raised, and moving the restraint members at a slower speed than the cartons, whereby said side of a carton situated behind a slower moving raised restraint member abuts and rotates about the latter as a fulcrum through a substantial angle.

13. A method according to claim 12, wherein the restraint members are swingable between their raised and lowered positions about generally horizontal axes, with free ends of the restraint members being located upstream of their respective axes, whereby the restraint members are adapted to be held in their raised positions by the action of cartons abutting thereagainst after the yieldable raising force has been relieved.

14. A method according to claim 12, wherein the step of applying a yieldable force comprises impinging pressurized air on the restraint members.

15. A method according to claim 12, wherein said carton-advancing step comprises engaging bottoms of the cartons with bands of elastomeric material extending around respective ones of a plurality of driven rollers.

16. A method according to claim 12, wherein the restraint members are biased to their lowered positions by gravity.

17. A method according to claim 12 including the step of contacting the cartons with a plough after the cartons have been turned about the restraint means, whereby the plough finishes turning the cartons through 90 degrees in total.

18. In an apparatus for closing cartons wherein the cartons are turned while being moved along a predetermined path, said apparatus comprising first conveyor means for advancing the cartons along the path in spaced apart relationship while supporting the cartons from beneath in a manner permitting the cartons to rotate in a generally horizontal plane; second conveyor means for moving a plurality of raisable restraint members along the path beneath the cartons at a location adjacent a side of each carton, with said side extending generally in the direction of said path, the restraint members being normally disposed in lowered positions and spaced apart by a distance less than a length of said side of each carton; a raising station disposed along said path including means for applying a yieldably raising force to the restraint members such that restraint members situated between adjacent cartons are raised as they pass the raising station; and means for driving said second conveyor means at a slower speed than said first conveyor means such that a side of a carton situated behind a slower moving raised restraint member abuts and rotates about the latter as a fulcrum through a substantial angle.

19. Apparatus according to claim 18, wherein the restraint members are mounted on the second conveyor means to be swingable between their raised and lowered positions about generally horizontal axes, with free ends of the restraint members being located upstream of their respective axes, whereby the restraint members are adapted to be held in their raised positions by the action of cartons abutting thereagainst after the yieldable biasing force is relieved.

20. Apparatus according to claim 18, wherein the means for applying a yieldable force comprises means for impinging pressurized air against the restraint members.

21. Apparatus according to claim 18, wherein the first conveyor means comprises a plurality of spaced rollers having bands of elastomeric material to engage the undersurfaces of cartons moving along the path.

22. Apparatus according to claim 18, wherein the second conveyor means comprises an endless chain conveyor having transversely extending pins spaced along its length, the restraint members being pivotally mounted on the pins for rotation to and from their raised positions.

23. Apparatus according to claim 22, wherein the restraint members have substantially planar plate portions, and depending lug portions in pivotal engagement with the pins, whereby in the retracted positions of the restraint members the plate portions are horizontal and generally coplanar.

24. Apparatus according to claim 23, wherein the plate portions are spaced from and below the under-surface of a carton moving along the path when the restraint members are in their lowered positions.

25. Apparatus according to claim 18, wherein the restraint members are individually biased to their lowered positions and are raisable by the member raising means.

26. Apparatus according to claim 25, wherein the restraint members are biased to their lowered positions by gravity.

27. Apparatus according to claim 18 including a plough means arranged downstream of locations in which the cartons are rotated about the restraint members, said plough means arranged to contact and to finish turning each carton through 90 degrees in total.

* * * * *